March 8, 1938. J. W. SALE Re. 20,667
ART OF PLY PAPER OR BOARD MANUFACTURE
Original Filed Oct. 24, 1934 3 Sheets-Sheet 1
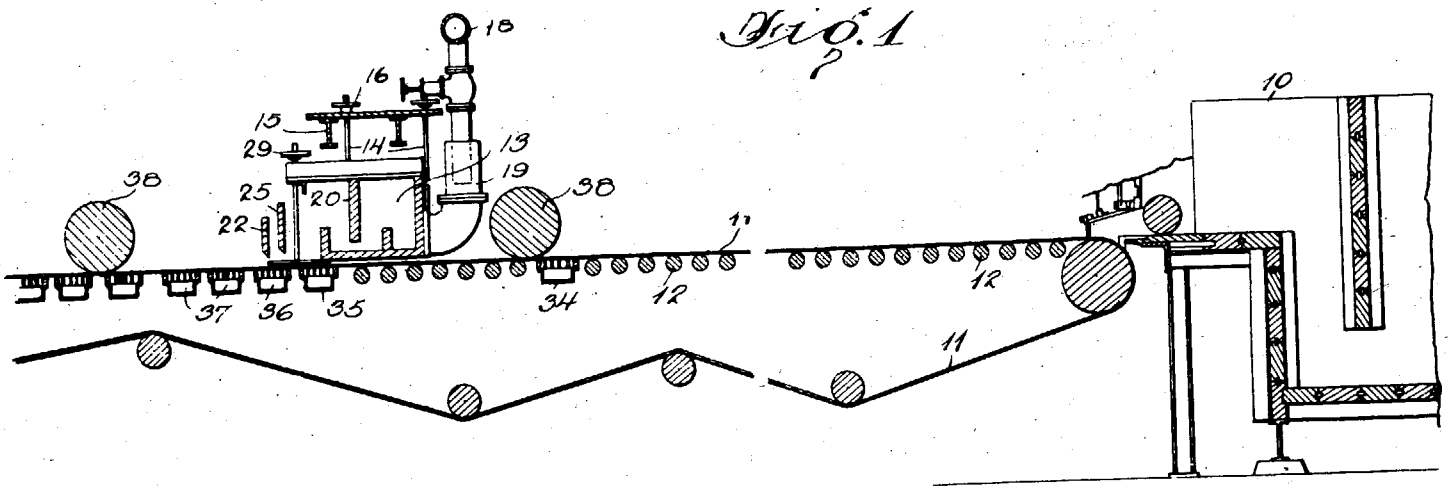
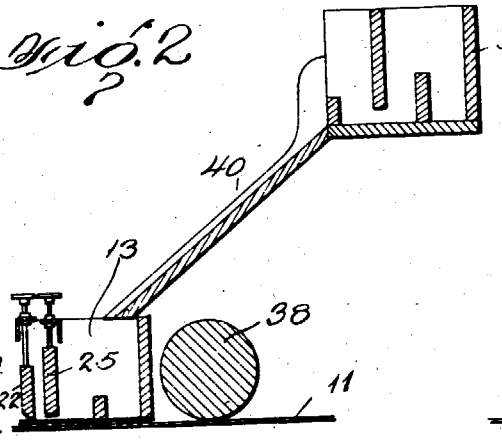
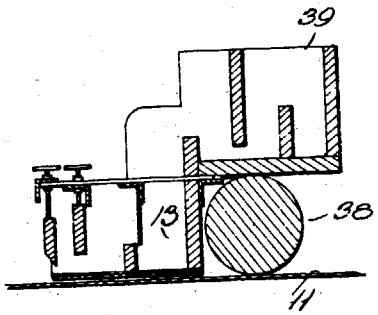
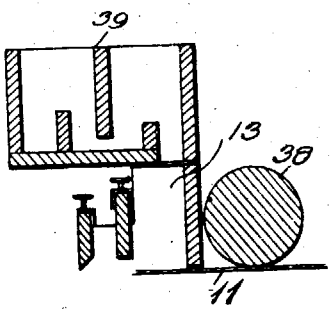
Inventor
John W. Sale
By Morsell, Sisler & Morsell.
Attorneys March 8, 1938. J. W. SALE Re. 20,667

ART OF PLY PAPER OR BOARD MANUFACTURE

Original Filed Oct. 24, 1934 3 Sheets-Sheet 2

Inventor
John W. Sale

By Morsell Lisle & Morsell
Attorneys.

March 8, 1938. J. W. SALE Re. 20,667
ART OF PLY PAPER OR BOARD MANUFACTURE
Original Filed Oct. 24, 1934 3 Sheets-Sheet 3
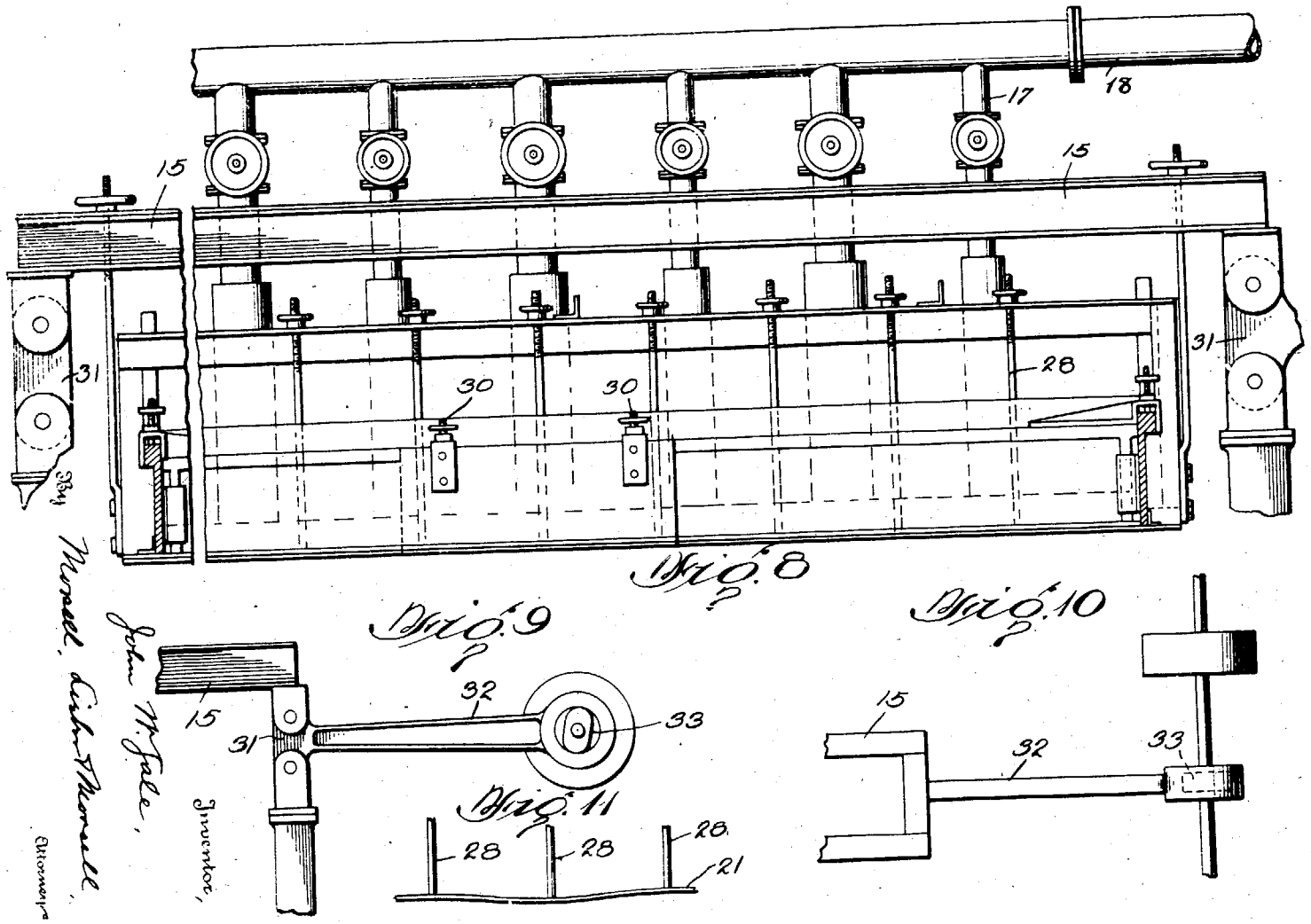
Inventor,
John W. Sale,
By Morsell, Lisbon & Morsell,
Attorneys Reissued Mar. 8, 1938 Re. 20,667

UNITED STATES PATENT OFFICE 20,667

ART OF PLY PAPER OR BOARD MANUFACTURE

John W. Sale, Hopewell, Va., assignor to Hummel-Ross Fibre Corporation, Hopewell, Va., a corporation of Virginia Original No. 2,018,382, dated October 22, 1935, Serial No. 749,839, October 24, 1934. Application for reissue August 18, 1937, Serial No. 159,768

13 Claims. (Cl. 92—39)

This invention relates to improvements in the art of ply paper or board manufacture.

In the manufacture of paper board, liners, and various grades of built-up vat-lined combination ply board, it has heretofore been necessary to use a single cylinder or multi-cylinder rotary machine. This type of machine has a number of serious disadvantages which are well known to those skilled in this art.

A general object of the present invention is to render it possible to manufacture the aforementioned type of paper or the like on a Fourdrinier type of machine, thereby being able to greatly increase speed of manufacture with a resulting increase in production. In practicing my method I form the usual web of sheet of paper or board in the regular manner on a Fourdrinier wire belt and superpose on this regular web or sheet another sheet made from the same materials and of the same color, or from different materials and of different colors, in such manner as to, first, improve the formation and texture of the sheet and give it greater tensile strength both with and across the grain; secondly, to provide a more uniform formation, improve the Mullen test and the finish or surface characteristics and produce a much more uniform and highly polished surface without the aid of starch, wax, or other ingredients used as a surface coating on some types of board; and thirdly, to obtain greater bulking, thus resulting in a lower weight per unit area for a given thickness of paper or board.

My invention further eliminates certain disadvantages which heretofore have been inherent in the Fourdrinier type of machine, in that, first, my invention enables the paper maker to control the sizing or absorbency on one or both sides of the sheet especially for use by the manufacturer of corrugated or solid fiber shipping cases, as it enables the box maker to get quicker and more uniform adhesion in pasting the board; secondly, the elimination of danger of splitting, blowing or checking frequently found in board made on cylinder machines, as more fully hereinafter set forth.

A specific object of the invention is to provide on a Fourdrinier type of machine, a homogeneous sheet of certain or known fiber content with a maximum amount of dilution, thus obtaining far better sheet finish than is regularly obtained on a cylinder machine, the advantageous result being especially noticeable where the bottom stock is of a greater degree of freeness than the liner stock which allows the use of increased volumes of water in the formation, to the end that the formation is greatly aided.

A further specific object of the invention is to lay down a homogeneous sheet of known fiber content with varying amounts of sizing materials in each face, thereby eliminating a substantial amount of sizing material on the bottom face, resulting in a considerable saving in sizing material cost, and also increasing the qualities of the ultimate product which are desired when the finished product is to be used in corrugating or pasting machines, the lower or base sheet in the present product, having less sizing, permitting of quicker setting of silicate adhesive.

Another specific object of the invention is to provide a homogeneous sheet of known fiber content having a more even surface than was possible of attainment heretofore, with the result that there can be a substantial reduction in the amount of surface or sizing materials over that required in standard practice for the attainment of a high finish with the elimination of hills and valleys.

A further specific object of the invention is to provide on a Fourdrinier type of machine, a homogeneous sheet of certain or known fiber content with varying amounts of stock hydration, thus obtaining far better driving qualities than are regularly obtained on a Fourdrinier machine, the advantageous result being especially noticeable where the bottom stock or the base sheet is of a greater degree of freeness than the liner stock or supplemental sheet which permits faster drying, to the end that the production is greatly increased. Still another specific object of the invention is to produce a homogeneous sheet of known fiber content, which in the finished product will have surfaces susceptible of readily receiving coloring material.

These and other objects and advantages will be apparent from the following detailed description.

A clear conception of the steps constituting the present improved method, and of the improved mechanism forming part of the present invention and on which the method may be commercially exploited, may be had by referring to the drawings accompanying and forming a part of this specification in which like reference characters designate the same or similar parts in the various views:

Figure 1 is a longitudinal vertical sectional view of the main parts of the forming end of a Fourdrinier machine of well known type;

Figures 2, 3 and 4 are respectively vertical sectional views of modified forms of the supplemental head-box;

Figure 8 is a side elevation of the rear, delivery side of the supplemental head-box;

Figures 9 and 10 are detail views of the shaker mechanism for the supplemental head-box; and Figure 11 is a detail view showing the manner in which the deposit plate may be flexed transversely for the purpose hereinafter set forth.

Figure 5:
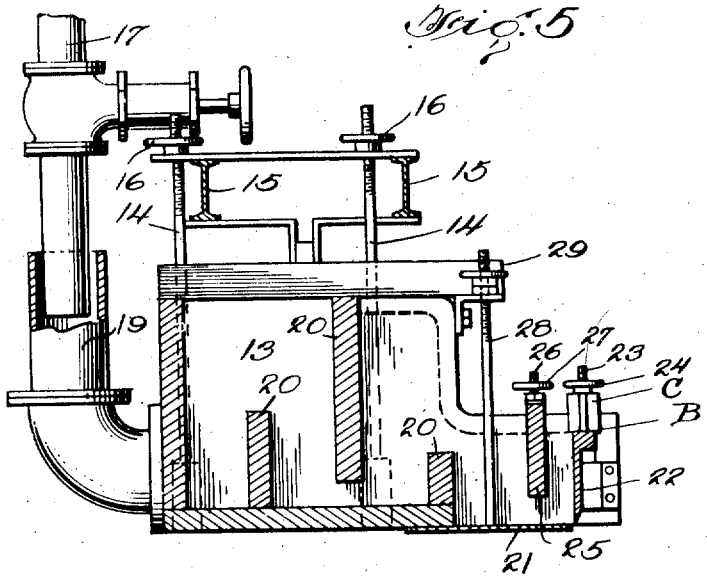
Figure 5 is a vertical transverse sectional view of the preferred form of head-box, such as shown in Figure 1.
Figure 6:
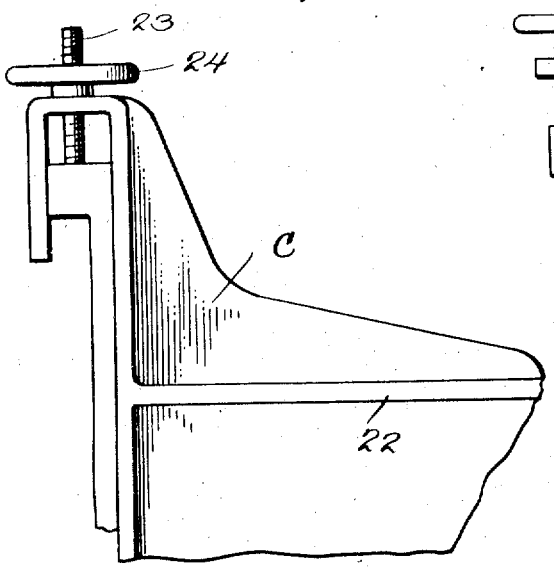
Figures 6 and 7 are detailed views of adjusting devices hereinafter described.
Figure 7:
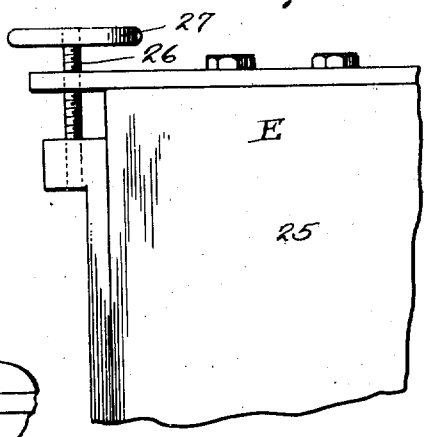

Referring to the drawings annexed by reference characters, 10 designates the usual main head-box of a Fourdrinier, which head-box is provided with the usual devices for delivering to the wire belt 11 the usual highly diluted water laid sheet, the usual table rolls 12 being employed to support the wire upon its rearward movement through the machine.

At any suitable point along the length of the rearwardly moving wire, I mount a supplemental head-box designated generally by the numeral 13, this head-box being suspended at a desirable point above the wire by means of vertical hanger bolts 14, two being used at each end of the head-box, and their upper ends being adjustably connected to a frame consisting mainly of a pair of I-beams 15. In this manner of supporting the head-box, it will be noted that it may be readily adjusted vertically and in addition may be more or less tilted toward one side or the other, as well as tilted fore and aft of the machine. This universal suspension of the supplemental head-box may be obtained in any suitable manner. I illustrate a simple way, namely, by threading hand-operable nuts 16 on the upper ends of the hanger bolts 14.

The stock is supplied to the superposed or supplemental head-box by means of valved vertical pipes 17 which have a common connection to a supply pipe 18, the lower ends of these vertical pipes 17 being arranged to loosely telescope into upturned elbows 19 whose lower ends empty into the chest 13 through the front wall thereof. By thus connecting the stock supply conduits with the supplemental chest, it will be seen that the chest will have a wide range of adjustment up and down and a sufficient range of transverse, as well as longitudinal, tilting to permit of all the adjustments desirable in properly depositing the supplemental top or liner sheet upon the base sheet.

The interior of the chest 13 is provided with suitable baffles 20 which extend from one end wall of the chest to the other end wall at points between the closed front wall of the chest and the open back wall thereof. One of these back walls depends from the top of the chest to a point near the bottom thereof, and the other two rise from the bottom of the chest, one of these latter baffles being arranged at the rear delivery side of the chest in such a position that the outgoing stock flows over its top edge. These baffles within the chest serve to not only assist in mixing the fibers with the water that carries them, but also destroy tendency to turbulency in the chest, and thus insure a smooth, quiet delivery of the stock outwardly over the top edge of the rearmost one of the baffles.

Projecting rearwardly from the rear, delivery side of the chest 13 is a deposit plate 21, whose forward edge is rigidly attached to the chest, and whose rear, delivery edge is free. This deposit plate 21 extends from one end to the other of the chest and is horizontally arranged so that the highly diluted stock may flow quietly off its rear, delivery edge onto the base sheet on the wire. To regulate the depth or thickness of the out-flowing stream, I provide a vertically adjustable sluice or gate 22, mounted to slide vertically on the rearwardly extended end walls of the chest, this vertical adjustment being accomplished by screws 23 and hand-nuts or wheels 24. This gate 22, together with the plate 21 and the adjacent baffle 20, forms a pool at the rear delivery end of the chest to thus further insure against agitation of the liquid stock, the quiet flow of the hydrated stock onto the base sheet being highly desirable in order to avoid rippling of the upper surface of the composite sheet. To still further quiet the liquid stock in the pool, I arrange therein a depending baffle 25. This is adjustably supported by screws 26 and hand-nuts 27 on the aforesaid rearwardly extended walls of the chest. In the construction above described, it will be seen that no matter how highly diluted the stock in the supplemental chest may be, I may deliver it in a quiet, even flow onto the base sheet.

I have discovered that by making the deposit plate 21 of thin, elastic metal, I may utilize this plate for insuring a uniform, even thickness of the finished paper or board. I have found that by providing means for flexing the delivery edge of the plate at a plurality of points across the machine, I may deliver varying quantities of the stock at points wherever needed across the base sheet, and thus correct any flaws in the finished sheet. In practice, by calipering the finished sheet in the usual manner, I ascertain at what points across the sheet more or less stock is needed and then make the flexing adjustments of the plate accordingly. In the present instance, the means for flexing the sheets at separated points consists of vertical rods 28 attached rigidly at their lower ends to the plate 21, and having their upper ends threaded and provided with hand-operable nut wheels 29. Each one of these adjustment devices is operable independently of the others, so the plate may be more or less flexed at different points along its length. The sluice or gate 22 is desirably made in two sections which may overlap each other midway the width of the machine, as shown in Figure 8, to thus enable this sluice or gate to be properly adjusted on the side walls of the chest. It is desirable, when this overlapped sluice is used, to provide the overlapped ends with adjusting devices 30 to insure proper alignment of the sections.

All Fourdrinier machines are provided with means for edgewisely shaking the wire after it leaves the breast-roll at the forming end of the machine to thus insure interlocking of the fibers in the sheet. I may arrange to lay the supplemental sheet upon the base sheet without laterally shaking the supplemental chest, in which case the fibers of the supplemental sheet lie approximately parallel with each other when they are bonded to the base sheet, and thus give to the finished composite sheet the highest possible degree of stiffness. On the other hand, I may so mount the supplemental chest that it too may be laterally shaken during the delivery operation to thus laterally agitate the fibers of the supplemental sheet and criss-cross them with respect to the fibers of the base sheet, and thus not only increase the homogeneous structure of the finished sheet but also give to it a flexibility that is desirable in many cases. To thus provide for shaking the supplemental box endwisely, I mount its supporting frame 16 upon a pair of upstanding, supporting pivotal links 31 and connect one of the links by means of an arm 32 to a power driven eccentric device 33, so that during the operation of the machine a lateral vibration of the suspension frame of the supplemental chest will be accomplished.

A feature of great importance in carrying out my method is that at the point where the top sheet is laid down upon the base sheet, the conditions shall be such as to insure a complete amalgamation or bonding of the two sheets in order that the finished sheet shall be completely homogeneous and not subject to peeling or separation under flexure. This complete bonding of superposed sheets has never heretofore been accomplished even in the cylinder machines now in general use in the manufacture of this type of board. I accomplish this very important result by providing means for setting the fibers in the underside of the base sheet and leaving the upper face of the base sheet in a sufficiently watery condition to insure its fibers intimately interlocking with the fibers of the supplemental sheet when it is laid down onto the watery face of the under sheet. That is to say, the fibers in the underside of the base sheet which have been set, as herein described, are not disturbed although it is not possible to avoid a certain amount of turbulence at the line of deposit of the top layer stock on the base sheet stock due to the fact, herein explained, that the watery top layer stock is quickly commingled with the watery top portion of the moving base layer stock. But the bottom surface of the base sheet retains the characteristics of the base sheet stock while at the same time there is a thorough commingling of the top high grade stock at the center of the sheet with the watery stock in the top surface of the base sheet. In the present illustration of my apparatus, I show three suction boxes 34, 35, 36 for accomplishing this purpose, these suction boxes being arranged under the wire and being constructed in the usual manner and subjected to the vacuum suction in the usual way, not shown. Any one or all of these suction boxes, or even additional suction boxes, may be used for preliminarily setting the under side of the sheet. The amount of suction the sheet is subjected to depends on the nature of the board or paper being produced, as is obvious, it being important only that a sufficient quantity of water in the base sheet shall be quickly extracted to set the fibers in the underside of the sheet and leave the upper side of the sheet in as watery condition as possible to thus enable the water on the upper surface of the sheet to commingle with the water coming down with the supplemental sheet. It will be noted that one of these suction boxes, namely 36, is located directly underneath the delivery edge of the deposit plate 21; this is desirable in order that the composite sheet shall be dehydrated as quickly as possible at the delivery point to thus insure an amalgamation of the two sheets as quickly as possible after they come together, and thus keep down as much as possible the natural tendency to ripple at the delivery point. Any number of additional suction boxes 37 may be placed beyond the preliminary setting boxes to insure the proper dehydration of the composite sheet before it reaches the usual finishing mechanism (not shown) at the end of the machine.

Any number of the usual dandy-rolls 38 may of course be used for smoothing the upper surface both of the base sheet and the composite sheet.

In some cases, it may be desirable to fasten a flexible apron or sheet on the deposit plate and have it extend beyond the delivery edge thereof in order to still further prevent undesirable turbulency at that point. It will be understood also that one or more additional supplemental chests may be employed if it be desired to produce a board having more than two plies. And it will be noted also that in my process the plies may be made of the same furnish or of different characters; for instance, for carton and box board it will be desirable to have a base sheet of a more porous nature so as to give it a better pasting surface, while the top layer may be made of such fibers that it will take a hard, smooth polish in the calenders. Also, in my process it is a simple matter to color either one or both the plies.

It is to be understood that where I refer to the under side of the sheet being set, I mean that the fibers have assumed their final position with reference to each other, and that where I refer to the top side of the base sheet as being in a watery condition at the point where the supplemental sheet is laid down thereon, I mean that the fibers in the top side of the sheet have not yet assumed their final position but are still in a floating condition in the water.

In the modification shown in Figure 2, I show an elevated chest 39 which may be employed for delivering the dehydrated stock to the chest 13 by means of a downwardly inclined board or trough 40.

In Figure 3, I show the supply chest 39 directly connected with the supplemental chest 13 and arranged under it, one of the dandy-rolls 38. In Figure 4, I show the elevated supply chest 39 projecting rearwardly so as to overhang the supplemental chest 13 and thus provide for a direct downward delivery of the stock into the chest 13.

All these changes may be resorted to, and many others, without departing from the spirit of my invention.

I claim:—

1. In combination with a paper making machine of the Fourdrinier type, a supplemental stock chest mounted above the wire belt having means for delivering a supplemental layer of stock upon the base sheet upon the wire and means whereby said supplemental stock chest may be vertically adjusted with respect to the wire, a stock supply-pipe having a plurality of depending valved branches, a corresponding plurality of upstanding inlet-pipes carried by the supplemental chest, the adjacent ends of the two sets of pipes having free telescoping connections whereby the supplemental chest may be raised and lowered and tilted without disconnection from said valved branches of the delivery pipes.

2. In combination with a paper making machine of the Fourdrinier type, a supplemental stock chest supported above the wire and having means for delivering a supplemental sheet of stock upon the base sheet on the wire, said means embodying a substantially horizontal deposit plate projecting from the supplemental stock chest in the direction of movement of the base sheet and having a delivery edge, means for forming a pool upon said deposit plate, and an upright plate at the delivery edge of said deposit plate for regulating the flow between said feed edge and the lower edge of said upright plate on to the base sheet, said regulating means embodying a vertically adjustable gate above said delivery edge and a vertically adjustable baffle arranged between said gate and the outlet of the supplemental chest.

3. In combination with a paper making machine of the Fourdrinier type, a supplemental stock chest supported above the wire and having means for delivering a supplemental sheet of stock upon the base sheet on the wire, said means embodying a substantially horizontal deposit plate projecting from the supplemental stock chest in the direction of movement of the base sheet and having a delivery edge, means for forming a pool upon said deposit plate, and an upright plate at the delivery edge of said deposit plate for regulating the flow between said feed edge and the lower edge of said upright plate on to the base sheet, said deposit plate being flexible transversely at its delivery edge and means being provided for flexing said delivery edge at separated points across the machine.

4. In combination with a paper making machine of the Fourdrinier type a supplemental stock chest supported above the wire and having means for delivering a supplemental sheet of stock upon the base sheet on the wire, said means embodying a substantially horizontal deposit plate projecting from the supplemental stock chest in the direction of movement of the base sheet and having a delivery edge, means for forming a pool upon said deposit plate, and an upright plate at the delivery edge of said deposit plate for regulating the flow between said feed edge and the lower edge of said upright plate on to the base sheet, means being provided for transversely shaking the supplemental box during the delivery of the supplemental sheet of stock.

5. In the art of making ply paper or ply board or products of a similar nature on a single Fourdrinier wire, continuously laying down a base sheet of free stock on the wire and continuously moving the same with the wire, dehydrating said base sheet as it travels by quickly extracting a sufficient quantity of water therefrom to set the fibers in the underside of the base sheet and leave the upperside of the sheet in a watery condition such as will enable it to commingle with a stock applied thereover, continuously delivering on the top side of said dehydrated base sheet a dilute stream of relatively slower stock and at a point where said base sheet has its upper or top side in such watery condition as to enable the water and fibers on the upper surface of the base sheet to commingle with the water and fibers of the slower stock and without disturbing the initial set of the fibers in the underside of the base sheet, dehydrating the composite sheet with sufficient rapidity to avoid a rippled finished sheet and causing the fibers of the adjacent surfaces of the respective stocks to intermingle and interlock by drawing down the fibers of the underpart of the slower stock into interlocking mixed relation with the fibers of the upper portion of the base sheet and thus form a sheet which is homogeneous and not subject to peeling and in which the fibers of the two stocks are interlocked within the body of the sheet, and the sheet has one surface composed of fibers from the top slow stock which will take a hard, smooth polish and another surface formed from the bottom free stock which is relatively porous and provides a pasting surface.

6. A process in accordance with claim 5 in which dehydration of the composite sheet is aided by suction applied by a suction box arranged adjacent the point of delivery of the dilute stream upon the base sheet.

7. A process in accordance with claim 5 in which dehydration of the composite sheet is aided by suction applied by a suction box arranged substantially beneath the point of delivery of the dilute stream upon the base sheet.

8. A process in accordance with claim 5 in which the two stocks have varying amounts of sizing materials and the base stock is less sized than the upper stock.

9. In the art of making ply paper or ply board or products of a similar nature on a single Fourdrinier wire, continuously applying a dilute suspension of fibrous stock on the wire and continuously moving the same with the wire, while dehydrating the same by quickly extracting a sufficient quantity of water therefrom to form a fibrous base sheet by setting the fibers in the underside of the base sheet and leaving the upperside of the sheet in a watery condition such as will enable it is commingle with a stock applied thereover, continuously delivering onto the top side of said formed dehydrated base sheet as it travels a dilute stream of stock and at a point where said base sheet has its upper or top side in such watery condition as to enable the water and fibers on the upper surface of the base sheet to commingle with the water and fibers of the second applied stock and without disturbing the initial set of the fibers in the underside of the base sheet, dehydrating the composite sheet with sufficient rapidity by suction applied beneath the point of delivery of the dilute stream upon the base sheet to avoid a rippled finished sheet and causing the fibers of the adjacent surfaces of the respective stocks to intermingle and interlock by drawing down the fibers of the underpart of the second applied stock into interlocking mixed relation with the fibers of the upper portion of the base sheet and thus form a sheet which is homogeneous and not subject to peeling and in which the fibers of the two stocks are interlocked within the body of the sheet.

10. In the art of making ply paper or ply board or products of a similar nature on a single Fourdrinier wire, continuously applying a dilute suspension of fibrous stock on the wire and continuously moving the same with the wire, while dehydrating the same by quickly extracting a sufficient quantity of water therefrom to form a fibrous base sheet by setting the fibers in the underside of the base sheet and leaving the upperside of the sheet in a watery condition such as will enable it to commingle with a stock applied thereover, said dehydration including conveying the wire-supported stock over table rolls and then applying suction to the base sheet, continuously delivering onto the top side of said formed dehydrated base sheet at a point substantially immediately after said suction is applied to the sheet and as the latter travels a dilute stream of stock and at a point where said base sheet has its upper or top side in such watery condition as to enable the water and fibers on the upper surface of the base sheet to commingle with the water and fibers of the second applied stock and without disturbing the initial set of the fibers in the underside of the base sheet, dehydrating the composite sheet with sufficient rapidity after delivery of the dilute stream upon the base sheet to avoid a rippled finished sheet and causing the fibers of the adjacent surfaces of the respective stocks to intermingle and interlock by drawing down the fibers of the under part of the second applied stock into interlocking mixed relation with the fibers of the upper portion of the base sheet and thus form a sheet which is homogeneous and not subject to peeling and in which the fibers of the two stocks are interlocked within the body of the sheet.

11. In the art of making ply paper or ply board or products of a similar nature on a single Fourdrinier wire, continuously applying a dilute suspension of fibrous stock on the wire and continuously moving the same with the wire, while dehydrating the same by quickly extracting a sufficient quantity of water therefrom to form a fibrous base sheet by setting the fibers in the underside of the base sheet and leaving the upperside of the sheet in a watery condition such as will enable it to commingle with a stock applied thereover, said dehydration including conveying the wire-supported stock over table rolls and then applying suction to the base sheet, continuously delivering onto the top side of said formed dehydrated base sheet at a point substantially immediately after said suction is applied to the sheet and as the latter travels a dilute stream of stock and at a point where said base sheet has its upper or top side in such watery condition as to enable the water and fibers on the upper surface of the base sheet to commingle with the water and fibers of the second applied stock and without disturbing the initial set of the fibers in the underside of the base sheet, dehydrating the composite sheet with sufficient rapidity by suction applied substantially beneath the point of delivery of the dilute stream upon the base sheet to avoid a rippled finished sheet and causing the fibers of the adjacent surfaces of the respective stocks to intermingle and interlock by drawing down the fibers of the underpart of the second applied stock into interlocking mixed relation with the fibers of the upper portion of the base sheet and thus form a sheet which is homogeneous and not subject to peeling and in which the fibers of the two stocks are interlocked within the body of the sheet.

12. In the art of making ply paper or ply board or products of a similar nature on a single Fourdrinier wire, continuously applying a dilute suspension of fibrous stock on the wire and continuously moving the same with the wire, while dehydrating the same by quickly extracting a sufficient quantity of water therefrom to form a fibrous base sheet by setting the fibers in the underside of the base sheet and leaving the upperside of the sheet in a watery condition such as will enable it to commingle with a stock applied thereover, continuously delivering onto the top side of said formed dehydrated base sheet as it travels a dilute stream of stock and at a point where said base sheet has its upper or top side in such watery condition as to enable the water and fibers on the upper surface of the base sheet to commingle with the water and fibers of the second applied stock and without disturbing the initial set of the fibers in the underside of the base sheet, dehydrating the composite sheet with sufficient rapidity by suction applied beneath and also immediately after the point of delivery of the dilute stream upon the base sheet to avoid a rippled finished sheet and causing the fibers of the adjacent surfaces of the respective stocks to intermingle and interlock by drawing down the fibers of the underpart of the second applied stock into interlocking mixed relation with the fibers of the upper portion of the base sheet and thus form a sheet which is homogeneous and not subject to peeling and in which the fibers of the two stocks are interlocked within the body of the sheet.

13. In the art of making ply paper or ply board or products of a similar nature on a single Fourdrinier wire, continuously applying a dilute suspension of fibrous stock on the wire and continuously moving the same with the wire, while dehydrating the same by quickly extracting a sufficient quantity of water therefrom to form a fibrous base sheet by setting the fibers in the underside of the base sheet and leaving the upperside of the sheet in a watery condition such as will enable it to commingle with a stock applied thereover, said dehydration including conveying the wire-supported stock over table rolls and then applying suction to the base sheet, continuously delivering onto the top side of said formed dehydrated base sheet at a point substantially immediately after said suction is applied to the sheet and as the latter travels a dilute stream of stock and at a point where said base sheet has its upper or top side in such watery condition as to enable the water and fibers on the upper surface of the base sheet to commingle with the water and fibers of the second applied stock and without disturbing the initial set of the fibers in the underside of the base sheet, dehydrating the composite sheet with sufficient rapidity by suction applied immediately after delivery of the dilute stream upon the base sheet to avoid a rippled finished sheet and causing the fibers of the adjacent surfaces of the respective stocks to intermingle and interlock by drawing down the fibers of the under part of the second applied stock into interlocking mixed relation with the fibers of the upper portion of the base sheet and thus form a sheet which is homogeneous and not subject to peeling and in which the fibers of the two stocks are interlocked within the body of the sheet.

JOHN W. SALE.